3,380,999
PROCESS FOR PREPARING SULFURIC ACID ESTERS OF LEVANS
Horst Grötsch, Frankfurt am Main, Germany, assignor to Farbwerke Hoechst Aktiengesellschaft vormals Meister Lucius & Brüning, Frankfurt am Main, Germany, a corporation of Germany
No Drawing. Filed Sept. 17, 1965, Ser. No. 488,259
Claims priority, application Germany, Sept. 19, 1964, F 44,019
2 Claims. (Cl. 260—234)

ABSTRACT OF THE DISCLOSURE

Carboxy lower alkyl levan sulfate having a combination of low toxicity and extended activity in inhibiting blood coagulation and a hydrolytically degraded product thereof useful for the treatment of disorders in lipid metabolism.

---

The present invention provides a process for preparing levan sulfates of different molecular weights distinguished by a low sulfur content and a moderate toxicity.

During recent years sulfurized polysaccharides have gained great importance since they show properties inhibiting the coagulation of blood, as well as lipolytic and thrombolytic properties. These activities are direct functions of the molecular weight and the degree of sulfurization of the polysaccharides. The toxicity of the compounds, however, likewise depends on the described two criteria.

Sulfurized carboxymethyl cellulose and carboxyalkyl dextran with a maximum sulfur content and a relatively favorable toxicity are already known. Dextran and cellulose are, however, very hardly degraded and excreted by the human organism so that pharmaceutical preparations on the base of said compounds show an extremely long period of activity and excretion which is undesirable in many cases. Since the substances are stored in the liver, there likewise exists the danger of chronical injuries of the tissue.

Now we have found that the reaction of levans of high molecular weight with lower halogenated fatty acids and a sulfurizing agent and, if desired, partial degradation, products are obtained which are relatively rapidly degraded and excreted by the organism.

The products possess a molecular weight of more than 12,000, a sulfur content of about 10–13% and a viscosity of $[\eta]=>0.20$. The action of inhibiting the coagulation of blood amounts to about 10–13% of that shown by heparin. The good tolerability of the products obtained according to the process of the present invention is demonstrated by an $LD_{50}$ of 1000–1200 milligrams/kilogram on intravenous application in mice.

For preparing the product of the invention, high-molecular levan is reacted in an alkaline medium with lower halogenated fatty acids, preferably chloracetic acid and chloropropionic acid. The reaction product is isolated from the solution, purified, for example, by precipitation with alcohol or by reprecipitation, dried and dissolved in formamide. A sulfurizing agent such as chlorosulfonic acid in pyridine is caused to react with the product and the reaction mixture is worked up in known manner.

If desired, the product of the invention can be hydrolytically degraded by means of cation exchangers containing sulfo groups present in the H+ form, in order to attain lower molecular weights. The hydrolysis by means of cation exchangers can be carried out, for instance, as described in U.S. patent application Ser. No. 424,124 of Jan. 7, 1965.

According to the process disclosed thereby, carboxyalkyl-sulfuric acid esters of levans with molecular weights exactly determined in advance and with defined activity can be prepared.

The termination of the hydrolysis is favorably determined by measuring the viscosity of an isolated sample. For this purpose, the viscosity number $[\eta]$ of the acid hydrolysis solution is determined by means of a suitable viscosimeter, for instance, a viscosimeter according to Ubbelhode at a temperature of 22.5° C.

$[\eta] = \eta_{\text{spec}}/c$; $c$ = concentration of the solution in grams/100 ml.

If desired, the carboxyalkyl-sulfuric acid esters of levans can be degraded to a viscosity $[\eta] = 0.030-0.12$.

From the aqueous solution, the low-molecular carboxyalkyl-sulfuric acid esters of levans can be obtained in known manner by neutralization, concentration and precipitation of the solvents.

The carboxyalkyl-sulfuric acid esters of levans prepared in the first stage of the process show the following physical properties:

Molecular weight _____ 12,000–50,000.
Sulfur content _____ 9–13%.
Viscosity $[\eta]$ _____ 0.25–0.65.
Sedimentation constant _____ $2-4 \cdot 10^{-13}$ sec.
Diffusion constant _____ $6-10 \cdot 10^{-7}$ cm.$^2 \cdot$ sec.$^{-1}$.

The products are subjected to hydrolytic degradation until molecular weights of 3,000–10,000, corresponding to a viscosity $[\eta]$ of 0.03–0.12 are attained. Particularly in the form of their alkali metal salts, preferably the sodium salts, the products can be used as substances inhibiting the coagulation of blood and/or showing lipolytic and thrombolytic action.

Independent of the molecular weight of the products of the invention, the lipolytic effect amounts to about 60–100% of that of heparin, when given in equal dose. The inhibition of thrombus formation is thrombo-elastographically ascertainable by the thrombo-elastogram according to Hartert (Z.f.d. gesamte experimentelle Medizin, volume 117, page 189 (1951)).

The activity of inhibiting the coagulation of blood depends on the molecular weight; high-molecular carboxymethyl-sulfuric acid esters of levans $[\eta > 0.2]$ show a distinct and long-lasting inhibition of blood coagulation together with a low toxicity which allows of using the substances for therapeutical purposes. Low-molecular carboxymethyl sulfuric acid esters of levans $[\eta < 0.06]$ show a very low activity in inhibiting the coagulation of blood, the lipolytic action not being affected, so that these substances are preferably appropriate for the treatment of disorders in lipid metabolism.

The following example serves to illustrate the invention but it is not intended to limit it thereto:

EXAMPLE (a) 200 grams of high-molecular levan $[\eta = 0.10-0.20]$ are dissolved in 600 millilitres of water. Upon addition of 600 millilitres of sodium hydroxide solution of 40% strength, the solution is cooled to $+10°$ C. in the ice-bath. During the addition of 300 grams of chloracetic acid the temperature is maintained between $+10$ and $+15°$ C. The clear solution is allowed to stand overnight at room temperature. It is then stirred into 10 millilitres of methanol. The product is purified by repeated reprecipitation in water and methanol.

Yield: 250 grams of levan carboxymethyl sulfate.

(b) 120 grams of the sodium salt of levan carboxymethyl sulfate are dissolved in 700 millilitres of formamide. The clear solution is added at 10–15° C. to a sulfurization mixture consisting of 500 millilitres of pyridine and 130 millilitres of chlorosulfonic acid. The gelatinous solution is reacted for 3 hours at 40° C. and the reaction product is precipitated in the form of its pyridine salt by pouring it into 7 litres of $CH_3OH$. The precipitate is dissolved in 600 millilitres of water while NaOH is added until the substance shows a phenol-phthalein-alkaline reaction and it is precipitated in 8 litres of $CH_3OH$. By dissolving and precipitating the substances for 3 times, the pyridine residues are removed. 140–150 grams of sulfurized carboxymethyl levan are obtained in the form of the disodium salt. Sulfur content: 12.5%; heparin action in the recalcification test according to U.S.P. direction: 12.5%.

$LD_{50}$ in mice: 1000 g./kilogram of body-weight; intravenous injection. Lipolytic activity: 70 to 100% of heparin activity when given to rabbits in a dose of 10 milligrams/kilogram of body-weight. Tested in lipemic dog plasma.

($c_1$) 20 grams of the sodium salt of sulfurized carboxymethyl levan are dissolved in 200 millilitres of water. By adding cation exchangers IRC–120 the solution is adjusted to pH 1.8, the exchanger is separated off and the solutions are heated to 50° C. The hydrolysis is interrupted when the viscosity number $[\eta]$ has reached 0.062.

The aqueous solution is cooled, neutralized and concentrated under reduced pressure to polysaccharide content of 25%. By addition of methanol the hydrolysis product precipitates. The yield amounts to 15 grams. An aqueous solution of 3% strength has a viscosity $[\eta]$ of 0.099 and in the recalcination test according to U.S.P. directions a heparin action of 9%.

The sulfur content amounts to 12.5%, the viscosity $[\eta]$ of an aqueous solution of 3% strength to 0.10; $LD_{50}$ in mice: 1500–2000 milligrams/kilogram with intravenous injection. Lipolytic action: With a dosage of 10 milligrams/kilogram of body weight intravenously administered to the rabbit, the clearing action in lipemic dog's plasma amounts to 80–100% of that of heparin.

($c_2$) 20 grams of the sodium salt of sulfurized carboxymethyl levan are dissolved in 200 millilitres of water. By adding the cation exchanger IRC–120 the solution is adjusted to pH 1.8, the exchanger is separated off and the solution is heated to 50° C. When a viscosity $[\eta]$ =0.035–0.038 is attained, the hydrolysis is interrupted. The aqueous solution is worked up as described sub (b). The yield amounts to 15 grams. An aqueous solution of 3% strength shows a viscosity $[\eta]$ of 0.039 to 0.042. Sulfur content: 12.5%. Heparin action in the recalcination test according to U.S.P. directions: about 1%. Lipolytic activity: 10 milligrams/kilogram given to rabbits show 60–100% of the heparin action, ascertained in lipemic dog's plasma.

I claim:
1. Carboxy lower alkyl levan sulfate, having a sulfur content of 9–13%, a viscosity $[\eta]$ of 0.25–0.65, a molecular weight between 12,000 and 50,000, a sedimentation constant between 2.0 and $4.0 \cdot 10^{-13}$ sec. and a diffusion constant of 6.0 and $10.0 \cdot 10^{-7}$ $cm^2 \cdot sec.^{-1}$.

2. Hydrolytically degraded carboxy lower alkyl levan sulfate, having a sulfur content of 9–13%, a viscosity $[\eta]$ of 0.03–0.12, and a molecular weight of 3000–10,000.

References Cited
UNITED STATES PATENTS

| | | | |
|---|---|---|---|
| 2,203,703 | 6/1940 | Stahly et al. | 260—234 |
| 2,689,848 | 9/1954 | Husemann et al. | 260—234 |

LEWIS GOTTS, *Primary Examiner.*

J. R. BROWN, *Assistant Examiner.*